United States Patent
Cheng

(10) Patent No.: US 12,524,973 B2
(45) Date of Patent: Jan. 13, 2026

(54) DISPLAY METHOD AND APPARATUS AND ELECTRONIC DEVICE

(71) Applicant: Beijing Zitiao Network Technology Co., Ltd., Beijing (CN)

(72) Inventor: Lin Cheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 309 days.

(21) Appl. No.: 18/465,569

(22) Filed: Sep. 12, 2023

(65) Prior Publication Data

US 2024/0135659 A1 Apr. 25, 2024
US 2024/0233287 A9 Jul. 11, 2024

(30) Foreign Application Priority Data

Oct. 19, 2022 (CN) .......................... 202211282493.3

(51) Int. Cl.
*G06T 19/00* (2011.01)
*G06T 7/33* (2017.01)

(52) U.S. Cl.
CPC .............. *G06T 19/006* (2013.01); *G06T 7/33* (2017.01); *G06T 2207/10028* (2013.01)

(58) Field of Classification Search
None
See application file for complete search history.

(56) References Cited

U.S. PATENT DOCUMENTS

| 2017/0068756 | A1* | 3/2017 | Wilsher | ................. G06F 30/20 |
| 2020/0150750 | A1* | 5/2020 | Suzuki | ................. G06F 3/0488 |
| 2021/0019946 | A1* | 1/2021 | Sonasath | ................. G06T 7/33 |

FOREIGN PATENT DOCUMENTS

| CN | 113066189 B | 6/2022 |
| CN | 114663632 A | 6/2022 |

* cited by examiner

*Primary Examiner* — Tapas Mazumder
(74) *Attorney, Agent, or Firm* — Astute IP Law Group

(57) ABSTRACT

The present disclosure provides a display method and apparatus and an electronic device. The method includes: acquiring a virtual image, configuration information of the virtual image, and environment information of a current environment; wherein the virtual image comprises at least one virtual object and virtual feature point information of the at least one virtual object in an extended reality space coordinate system, and the environment information comprises point cloud information of at least one real object; determining a position relation between the real object and the virtual object, based on the virtual feature point information of the virtual object in the extended reality space coordinate system and the point cloud information; rendering the virtual object in accordance with one or more of the position relation, the configuration information, and the environment information, to determine a rendered image; and displaying the rendered image.

20 Claims, 6 Drawing Sheets

DISPLAY METHOD AND APPARATUS AND ELECTRONIC DEVICE

CROSS-REFERENCE TO RELATED APPLICATIONS

The present disclosure is based on and claims priority to China Patent Application No. 202211282493.3 filed on Oct. 19, 2022 and entitled as "DISPLAY METHOD AND APPARATUS AND ELECTRONIC DEVICE", the disclosure of which is incorporated by reference herein in its entirety.

TECHNICAL FIELD

The present disclosure relates to a technical field of extended reality, and in particular, to a display method and apparatus, and an electronic device.

BACKGROUND

Currently, in the technical field of Extended Reality, when a user uses an Extended Reality (XR) device (such as a Virtual Reality (VR) device, an Augmented Reality (AR) device, and a Mixed Reality (MR) device), the user needs to directly or indirectly view a real object and a virtual object in a real scene through the XR device.

SUMMARY

The present disclosure provides the following technical solutions.

In a first aspect, the present disclosure provides a display method, comprising: acquiring a virtual image, configuration information of the virtual image, and environment information of a current environment; wherein the virtual image comprises at least one virtual object and virtual feature point information of the at least one virtual object in an extended reality space coordinate system, and the environment information comprises point cloud information of at least one real object; determining a position relation between the real object and the virtual object, based on the virtual feature point information of the virtual object in the extended reality space coordinate system and the point cloud information; rendering the virtual object in accordance with one or more of the position relation, the configuration information, and the environment information, to determine a rendered image; and displaying the rendered image.

As an alternative implementation of the present disclosure, the determining a position relation between the real object and the virtual object, based on the virtual feature point information of the virtual object in the extended reality space coordinate system and the point cloud information, comprises: pre-processing the point cloud information, and determining real feature point information of the real object in the extended reality space coordinate system; and determining the position relation between the real object and the virtual object based on the real feature point information and the virtual feature point information of the virtual object in the extended reality space coordinate system.

As an alternative implementation of the present disclosure, the virtual feature point information comprises at least one virtual feature point and virtual position information of each virtual feature point, and the real feature point information comprises at least one real feature point and real position information of each real feature point; and the determining the position relation between the real object and the virtual object based on the real feature point information and the virtual feature point information of the virtual object in the extended reality space coordinate system comprises: determining a first depth distance of each virtual feature point from a target position point based on the virtual position information of the virtual object in the extended reality space coordinate system; determining a second depth distance of each real feature point from the target position point based on the real position information of the real object in the extended reality space coordinate system; and determining the position relation between the real object and the virtual object in accordance with the first depth distance and the second depth distance.

As an alternative implementation of the present disclosure, the configuration information comprises virtual illumination information, and the environment information further comprises real illumination information; and the rendering the virtual object in accordance with one or more of the position relation, the configuration information, and the environment information, to determine a rendered image, comprises: rendering the virtual object in accordance with the position relation, the virtual illumination information, and the real illumination information, to determine the rendered image.

As an alternative implementation of the present disclosure, the rendering the virtual object in accordance with the position relation, the virtual illumination information, and the real illumination information, to determine the rendered image, comprises: performing fusion processing on the virtual illumination information and the real illumination information to determine fused illumination information; and rendering the virtual object in accordance with the position relation and the fused illumination information to determine the rendered image.

As an alternative implementation of the present disclosure, the virtual illumination information and the real illumination information each comprises color information, and the color information comprises one or more of brightness, color temperature, white balance, soft light, and hard light; and the performing fusion processing on the virtual illumination information and the real illumination information to determine fused illumination information, comprises: performing superimposition processing on the color information in the virtual illumination information and the color information in the real illumination information to determine fused color information; and determining the fused color information as the fused illumination information.

As an alternative implementation of the present disclosure, the rendering the virtual object in accordance with one or more of the position relation, the configuration information, and the environment information, to determine a rendered image, comprises: rendering the virtual object in accordance with the position relation to determine the rendered image.

In a second aspect, the present disclosure provides a display apparatus comprising: an acquisition unit configured to acquire a virtual image, configuration information of the virtual image, and environment information of a current environment; wherein the virtual image comprises at least one virtual object and virtual feature point information of the at least one virtual object in an extended reality space coordinate system, and the environment information comprises point cloud information of at least one real object; a processing unit configured to determine a position relation between the real object and the virtual object, based on the virtual feature point information of the virtual object in the extended reality space coordinate system acquired by the acquisition unit and the point cloud information acquired by the acquisition unit; the processing unit being further configured to render the virtual object in accordance with one or more of the position relation, and the configuration information, and the environment information acquired by the acquisition unit, to determine a rendered image; and a display unit configured to display the rendered image.

As an alternative implementation of the present disclosure, the processing unit is specifically configured to: pre-process the point cloud information acquired by the acquisition unit, and determine real feature point information of the real object in the extended reality space coordinate system; and the processing unit is specifically configured to determine the position relation between the real object and the virtual object based on the real feature point information and the virtual feature point information of the virtual object in the extended reality space coordinate system acquired by the acquisition unit.

As an alternative implementation of the present disclosure, the virtual feature point information comprises at least one virtual feature point and virtual position information of each virtual feature point, and the real feature point information comprises at least one real feature point and real position information of each real feature point; the processing unit is specifically configured to: determine a first depth distance of each virtual feature point from a target position point based on the virtual position information of the virtual object in the extended reality space coordinate system; the processing unit is specifically configured to: determine a second depth distance of each real feature point from the target position point based on the real position information of the real object in the extended reality space coordinate system; and the processing unit is specifically configured to: determine the position relation between the real object and the virtual object in accordance with the first depth distance and the second depth distance.

As an alternative implementation of the present disclosure, the configuration information comprises virtual illumination information, and the environment information further comprises real illumination information; the processing unit is specifically configured to: render the virtual object in accordance with the position relation, the virtual illumination information, and the real illumination information, to determine the rendered image.

As an alternative implementation of the present disclosure, the processing unit is specifically configured to: perform fusion processing on the virtual illumination information and the real illumination information to determine fused illumination information; and the processing unit is specifically configured to: render the virtual object in accordance with the position relation and the fused illumination information to determine the rendered image.

As an alternative implementation of the present disclosure, the virtual illumination information and the real illumination information each comprises color information, and the color information comprises one or more of brightness, color temperature, white balance, soft light, and hard light; the processing unit is specifically configured to: perform superimposition processing on the color information in the virtual illumination information and the color information in the real illumination information to determine fused color information; and the processing unit is specifically configured to: determine the fused color information as the fused illumination information.

As an alternative implementation of the present disclosure, the processing unit is specifically configured to: render the virtual object in accordance with the position relation to determine the rendered image.

In a third aspect, the present disclosure provides an electronic device comprising: a memory configured to store a computer program and a processor configured to, when executing the computer program, causes the electronic device to implement any one of the display methods as provided in the first aspect.

In a fourth aspect, the present disclosure provides a non-transitory computer-readable storage medium having a computer program stored thereon, which, when executed by a processor, causes the processor to implement any one of the display methods as provided in the first aspect.

In a fifth aspect, the present disclosure provides a computer program product comprising a computer program, which, when run on a computer, causes the computer to implement any one of the display methods as provided in the first aspect.

For the description of the second, third, fourth and fifth aspects of the present disclosure, reference may be made to the detailed description of the first aspect; in addition, for the beneficial effects described in the second, third, fourth and fifth aspects, reference may be made to the beneficial effect analysis of the first aspect, and details are not repeated here.

In the present disclosure, the names of the display apparatus do not limit the devices or function modules themselves, and in actual implementations, these devices or function modules may appear with other names. Insofar as the functions of the respective devices or functional modules are similar to those of the present disclosure, they fall within the scope of the claims of the present disclosure and their equivalents.

These and other aspects of the present disclosure will be more readily understood in the following description.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to more clearly illustrate the embodiments of the present disclosure or technical solutions in the related art, the drawings used in the embodiments or the related art will be briefly described below, and it is apparent for those skilled in the art that other drawings can be obtained according to these drawings without paying out creative efforts.

DETAILED DESCRIPTION

Figure 1:
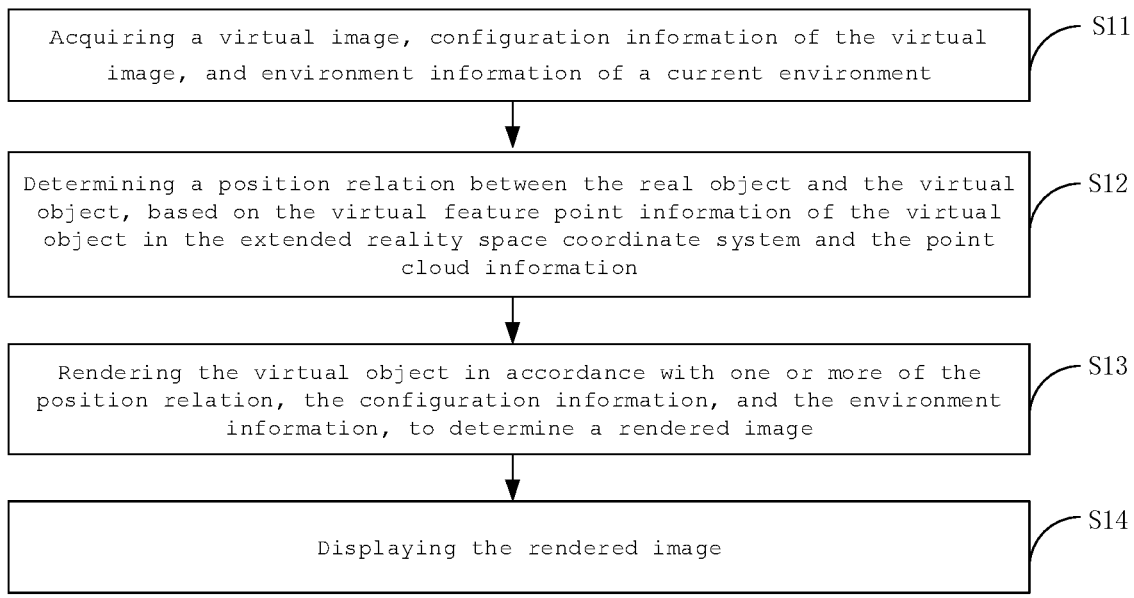
FIG. 1 is a first schematic flowchart of a display method according to an embodiment of the present disclosure.

In order that the above objectives, features and advantages of the present disclosure can be more clearly understood, the solutions of the present disclosure will be further described below. It should be noted that, without conflicts, the embodiments of the present disclosure and features in the embodiments may be combined with each other.

In the following description, numerous specific details are set forth in order to provide a thorough understanding of the present disclosure, but the present disclosure may be practiced otherwise than as described herein; apparently, the embodiments in the description are only a few embodiments of the present disclosure, and not all embodiments.

It is noted that, in this disclosure, relational terms such as "first" and "second," and the like, are used merely to distinguish one entity or action from another entity or action without necessarily requiring or implying any actual such relationship or order between such entities or actions. Also, the terms "comprise," "include," or any other variation thereof, are intended to cover a non-exclusive inclusion, such that a process, method, article, or apparatus that comprises a list of elements not only includes those elements, but also include other elements not expressly listed or inherent to such process, method, article, or apparatus. Without further limitation, an element defined by the phrase "comprising an . . . " does not exclude the presence of other identical elements in the process, method, article, or apparatus that comprises the element.

As mentioned above, the user needs to directly or indirectly view a real object and a virtual object in a real scene through the XR device, and at this time, the XR device is required to be capable of determining a relative position relation between the real object and the virtual object, so that a display effect can be ensured.

Therefore, how to more truly display the relative position relation between the real object and the virtual object becomes a technical problem to be solved urgently.

In view of this, the present disclosure provides a display method and apparatus, and an electronic device, to solve a problem in the related art how to determine a relative position relation between a real object and a virtual object.

Compared with the related art, the technical solutions provided by the present disclosure have the following advantages.

By acquiring the virtual image, the configuration information of the virtual image, and the environment information of the current environment, the position relation between the real object and the virtual object can be determined based on the virtual feature point information of the virtual object in the extended reality space coordinate system and the point cloud information, for example: by converting points in the point cloud information into real feature points in the extended reality space coordinate system. Thereafter, by calculating the first depth distance of the virtual feature point from the target position point; and determining the second depth distance of each real feature point from the target position point in accordance with the real position information of the real object in the extended reality space coordinate system; the position relation between the real object and the virtual object is determined in accordance with the first depth distance and the second depth distance. Thereafter, the virtual object is rendered in accordance with one or more of the position relation, the configuration information, and the environment information, to determine a rendered image; and the rendered image is displayed. Since the position information between the real object and the virtual object has been obtained when the rendered image is generated, the position information between the real object and the virtual object can be displayed more accurately in the rendered image, thereby solving the problem of how to more truly display the relative position relation between the real object and the virtual object.

The See-Through in the embodiments of the present disclosure refers to a function of, while wearing a XR device, viewing a real-time environment outside the XR device by using an image acquisition device (e.g., a camera) installed in the XR device, and is also generally referred to as a "perspective function". See-Through is divided into optical perspective and video perspective technologies, wherein the optical perspective directly sees the outside with an optical lens. The video perspective uses a camera to acquire real-time views of the surrounding environment, processes pictures captured by cameras through an anti-distortion algorithm, and then outputs pictures that simulate the perspective of the outside on a head-mounted display.

Point cloud in the embodiments of the present disclosure refers to a data set of points in a certain coordinate system (e.g., a world coordinate system). The point cloud contains rich information including three-dimensional coordinates X, Y, Z, color, classification value, intensity value, time, etc.

Exemplarily, the display method provided by the embodiment of the present disclosure is described, by taking as an example that an execution subject for executing the display method provided by the embodiment of the present disclosure is a XR device.

FIG. 1 is a flowchart illustrating a display method according to an exemplary embodiment, which, as shown in FIG. 1, comprises: S11-S14.

S11, acquiring a virtual image, configuration information of the virtual image, and environment information of a current environment; wherein the virtual image comprises at least one virtual object and virtual feature point information of the at least one virtual object in an extended reality space coordinate system, and the environment information comprises point cloud information of at least one real object.

In some examples, when displaying each frame of rendered image, the XR device may fuse and render the virtual image that needs to be displayed in the current frame and the environment image of the current environment that is acquired in the current frame, so that the user may view the virtual object while viewing the current environment, thereby ensuring the user experience.

In some examples, the point cloud information may be determined from a binocular image of the current environment acquired by a binocular camera (Stereo Camera) mounted on the XR device. Alternatively, the point cloud information of the current environment is acquired by a laser scanner (Laser Scanner/LiDAR Light Detection And Ranging) installed on the XR device. Alternatively, the point cloud information of the current environment is acquired by a depth camera installed on the XR device. Alternatively, a Structure from motion (SFM) algorithm is used to process a plurality of environment images of the current environment acquired by the image acquisition apparatus provided on the XR device, so as to obtain the point cloud information of the current environment.

S12, determining a position relation between the real object and the virtual object based on the virtual feature point information of the virtual object in the extended reality space coordinate system and the point cloud information.

In some examples, since a coordinate system corresponding to the point cloud information is different from the extended reality space coordinate system corresponding to the virtual object, the coordinate system corresponding to the point cloud information needs to be converted into a coordinate system consistent with the extended reality space coordinate system corresponding to the virtual object, so as to facilitate subsequent calculations. For example, when the coordinate system corresponding to the point cloud information is a world coordinate system, and the extended reality space coordinate system corresponding to the virtual object is a camera coordinate system, points in the point cloud information may be converted into real feature points in the camera coordinate system through a first RT matrix (rotation matrix/translation matrix) between the world coordinate system and the camera coordinate system, which is pre-configured by the XR device. Then, a first depth distance from the virtual feature point to a target position point (such as a center point of a display screen of the XR device, or an optical center of an image acquisition apparatus mounted on the XR device, or an origin of the camera coordinate system) and a second depth distance from the real feature point to the target position point are calculated, so that the position relation between the real object and the virtual object can be determined in accordance with a magnitude relationship between the first depth distance and the second depth distance.

Alternatively, when the coordinate system corresponding to the point cloud information is the world coordinate system, and the extended reality space coordinate system corresponding to the virtual object is a helmet coordinate system, the points in the point cloud information may be converted into real feature points in the helmet coordinate system through a first RT matrix (rotation matrix/translation matrix) between the world coordinate system and the camera coordinate system and a second RT matrix (rotation matrix/translation matrix) between the camera coordinate system and the helmet coordinate system, which are pre-configured by the XR device. Then, a first depth distance from the virtual feature point to a target position point (such as a center point of a display screen of the XR device, or an optical center of an image acquisition apparatus mounted on the XR device, or an origin of a camera coordinate system) and a second depth distance from the real feature point to the target position point are calculated, so that the position relation between the real object and the virtual object can be determined in accordance with a magnitude relationship between the first depth distance and the second depth distance.

S13, rendering the virtual object in accordance with one or more of the position relation, the configuration information, and the environment information, to determine a rendered image.

In some examples, to reduce occupation of computing resources of the XR device, the virtual object may be rendered only in accordance with the position relation, to determine the rendered image, so that a problem that occlusion occurs between the virtual object and the real object may be avoided.

In other examples, to make the rendered image displayed by the XR device more realistic, the virtual object may be rendered in accordance with the position relation, the configuration information, and the environment information, to determine the rendered image. Therefore, the problem that occlusion occurs between the virtual object and the real object can be avoided, and meanwhile, color information of the virtual object can be adjusted, so that the color information of the virtual object is more in line with the current environment, to guarantee authenticity of the rendered image.

S14, displaying the rendering image.

In some examples, the XR device may output the rendered image in combination with See-Through when displaying the rendered image, so that the user may view the virtual object while viewing the current environment, thereby ensuring the user experience.

As can be seen from the above, by acquiring the virtual image, the configuration information of the virtual image, and the environment information of the current environment, the XR device can determine the position relation between the real object and the virtual object based on the virtual feature point information of the virtual object in the extended reality space coordinate system and the point cloud information. Then, the virtual object is rendered in accordance with one or more of the position relation, the configuration information, and the environment information, to determine a rendered image; and the rendered image is displayed. Since the position information between the real object and the virtual object has been obtained when the rendered image is generated, the position information between the real object and the virtual object can be displayed more accurately in the rendered image, so as to ensure the user experience.

Figure 2:
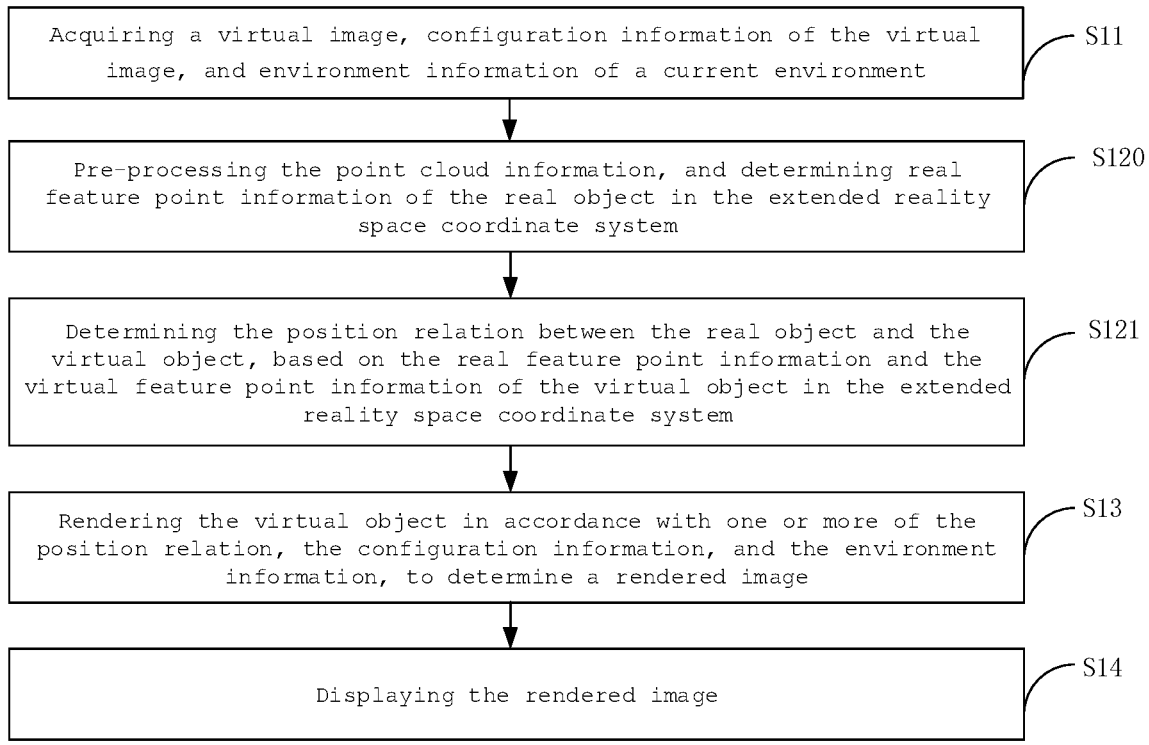
FIG. 2 is a second schematic flowchart of a display method according to an embodiment of the present disclosure.

As an alternative implementation of the present disclosure, with reference to FIG. 1 and as shown in FIG. 2, the above S12 may be specifically implemented by the following S120 and S121.

S120, pre-processing the point cloud information, and determining real feature point information of the real object in the extended reality space coordinate system.

In some examples, the pre-processing includes one or more of filtering, noise reduction, or smoothing processing. The point cloud information comprises point cloud corresponding to at least one real object, and after the point cloud information is pre-processed, the point cloud corresponding to respective real objects can be more accurately determined. The coordinate system of the points in the point cloud is different from the extended reality space coordinate system in which the virtual object is located. For example: when the coordinate system in which the points in the point cloud are located is a world coordinate system, and the extended reality space coordinate system in which the virtual object is located is a camera coordinate system, the points in the point cloud may be multiplied by a first RT matrix between the world coordinate system and the camera coordinate system, which is pre-configured by the XR device, so as to convert the points in the point cloud into the camera coordinate system. Alternatively, when the coordinate system in which the points in the point cloud are located is the world coordinate system and the extended reality space coordinate system in which the virtual object is located is a helmet coordinate system, the points in the point cloud may be multiplied by the first RT matrix, so that the points in the point cloud are converted into the camera coordinate system. Then, each of the points in the point cloud in the camera coordinate system is multiplied by a second RT matrix, so that the points in the point cloud are converted into the helmet coordinate system. By executing the above operation on each point in the point cloud corresponding to the real object, the real feature point information of the real object in the extended reality space coordinate system can be determined.

S121, determining the position relation between the real object and the virtual object based on the real feature point information and the virtual feature point information of the virtual object in the extended reality space coordinate system.

In some examples, the real feature point information and the virtual feature point information of the virtual object in the extended reality space coordinate system may be projected onto each plane of the extended reality space coordinate system in turn, so that the position relation between the real object and the virtual object may be determined. Alternatively, determining a first depth distance of each virtual feature point from the target position point based on the virtual position information of the virtual object in the extended reality space coordinate system; determining a second depth distance of each real feature point from the target position point based on real position information of the real object in the camera coordinate system; and determining the position relation between the real object and the virtual object in accordance with the first depth distance and the second depth distance.

Figure 3:
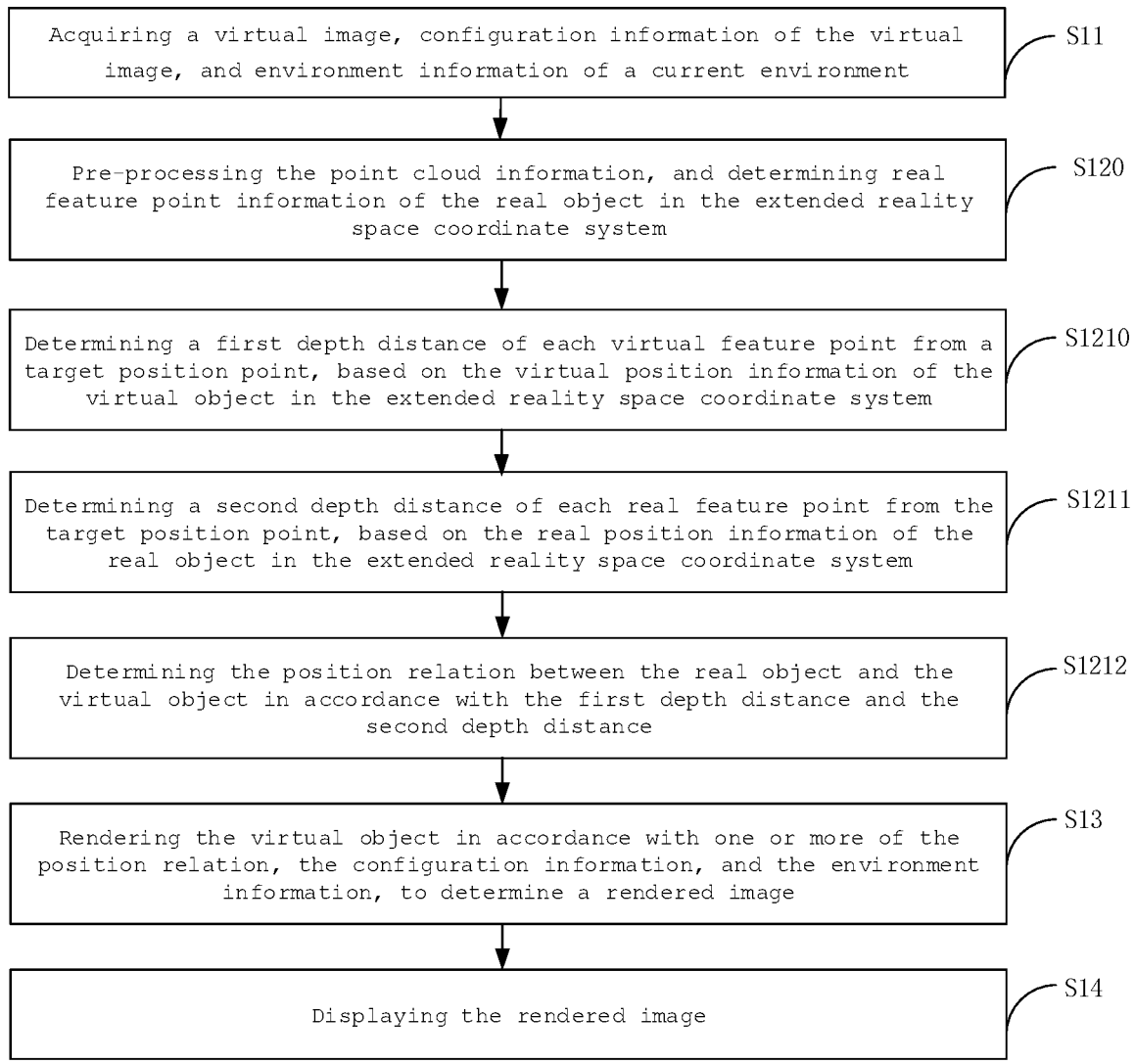
FIG. 3 is a third schematic flowchart of a display method according to an embodiment of the present disclosure.

As an alternative implementation of the present disclosure, the virtual feature point information includes at least one virtual feature point and virtual position information of each virtual feature point, and the real feature point information includes at least one real feature point and real position information of each real feature point; with reference to FIG. 2 and as shown in FIG. 3, S121 may specifically comprise the following S1210-S1212.

S1210, determining a first depth distance of each virtual feature point from a target position point based on virtual position information of the virtual object in the extended reality space coordinate system.

S1211, determining a second depth distance of each real feature point from the target position point based on real position information of the real object in the extended reality space coordinate system.

S1212, determining the position relation between the real object and the virtual object in accordance with the first depth distance and the second depth distance.

Figure 4:
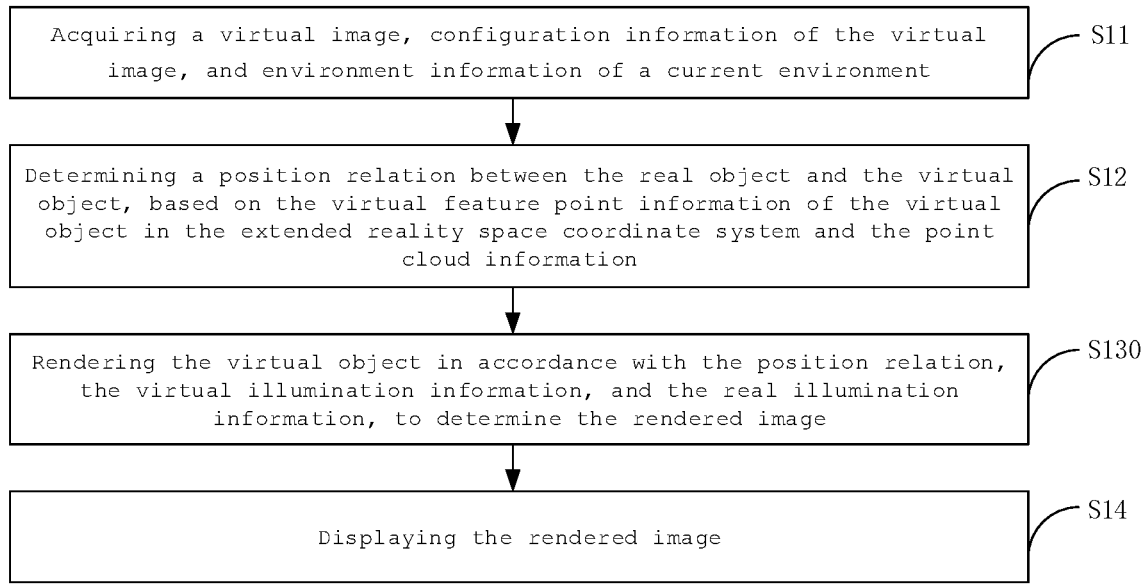
FIG. 4 is a fourth schematic flowchart of a display method according to an embodiment of the present disclosure.

As an alternative implementation of the present disclosure, the configuration information includes virtual illumination information, and the environment information further includes real illumination information; with reference to FIG. 1 and as shown in FIG. 4, S13 may be implemented by S130 described below.

S130, rendering the virtual object in accordance with the position relation, the virtual illumination information, and the real illumination information, to determine the rendered image.

In some examples, the position relation between the virtual object and the real object is fixed, and there is a difference between the virtual illumination information of the virtual object generated by a virtual light source and the real illumination information of the real object generated by a real light source. In order that the virtual object can be better blended into the current environment, the real light source can be found through interpolation calculation, in accordance with areas with light and shade changes (for example, difference values of color level values of adjacent pixel points are larger than or equal to a preset threshold) in the environment image of the real environment. And then, a trend of real light is determined by analyzing a relative position between the real light source and the areas with light and shade changes in the environment image. Thus, the virtual object can be rendered in accordance with the position of the real light source and the trend of real light, so that it can be ensured that the virtual object can be better blended into the current environment.

In some other examples, the position relation between the virtual object and the real object is fixed, and there is a difference between the virtual illumination information of the virtual object generated by the virtual light source and the real illumination information of the real object generated by the real light source. In order that the real object can be better blended into the virtual image, the virtual light source can be found through interpolation calculation, in accordance with areas with light and shade changes (for example, difference values of color level values of adjacent pixel points are larger than or equal to a preset threshold) in the virtual image. And then, a trend of virtual light is determined by analyzing a relative position between the virtual light source and the areas with light and shade changes in the virtual image. Thus, the real object can be rendered in accordance with the position of the virtual light source and the trend of virtual light, so that the real object can be better blended into the virtual image.

In some examples, the configuration information further includes an image size of the virtual image, and when the image size of the virtual image is different from the image size of the environment image of the current environment, the image size of the virtual image needs to be converted into an image size consistent with the image size of the environment image of the current environment, thereby ensuring the consistency of the display effect.

Figure 5:
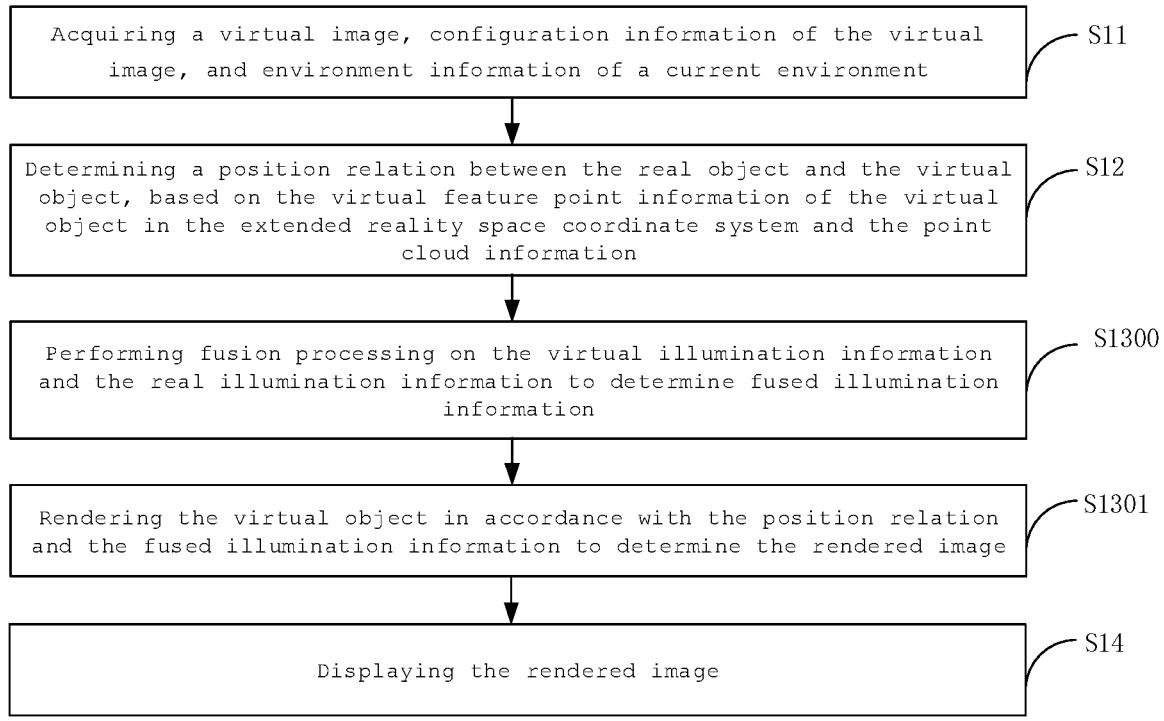
FIG. 5 is a fifth schematic flowchart of a display method according to an embodiment of the present disclosure.

As an alternative implementation of the present disclosure, with reference to FIG. 4 and as shown in FIG. 5, the above S130 may be specifically implemented by the following S1300 and S1301.

S1300, performing fusion processing on the virtual illumination information and the real illumination information to determine fused illumination information.

In some examples, in combination with the examples given in S130 above, when fusion processing is performed on the virtual illumination information and the real illumination information, the fused illumination information may be obtained by inputting the position of the virtual light source, the trend of virtual light, the position of the real light source, the trend of real light, the virtual illumination information, and the real illumination information into a fusion network.

The training process of the fusion network is as follows.

Training sample data and a marking result of the training sample data are acquired. The training sample data comprises illumination information of each of two different light sources obtained when the light sources illuminate a target object at different positions and angles, and the marking result comprises fused illumination information of the target object obtained when the two different light sources illuminate the target object at the different positions and angles.

The training sample data is input into a neural network model to obtain a prediction result of the neural network model on the training sample data.

In a case wherein the prediction result is different from the marking result, network parameters of the neural network model are adjusted, and the training sample data is re-input into the neural network model, until the prediction result is the same as the marking result, so as to obtain the fusion network.

Alternatively, superimposition processing is performed on the color information in the virtual illumination information and the color information in the real illumination information, to determine the fused color information.

S1301, rendering the virtual object in accordance with the position relation and the fused illumination information to determine the rendered image.

Figure 6:
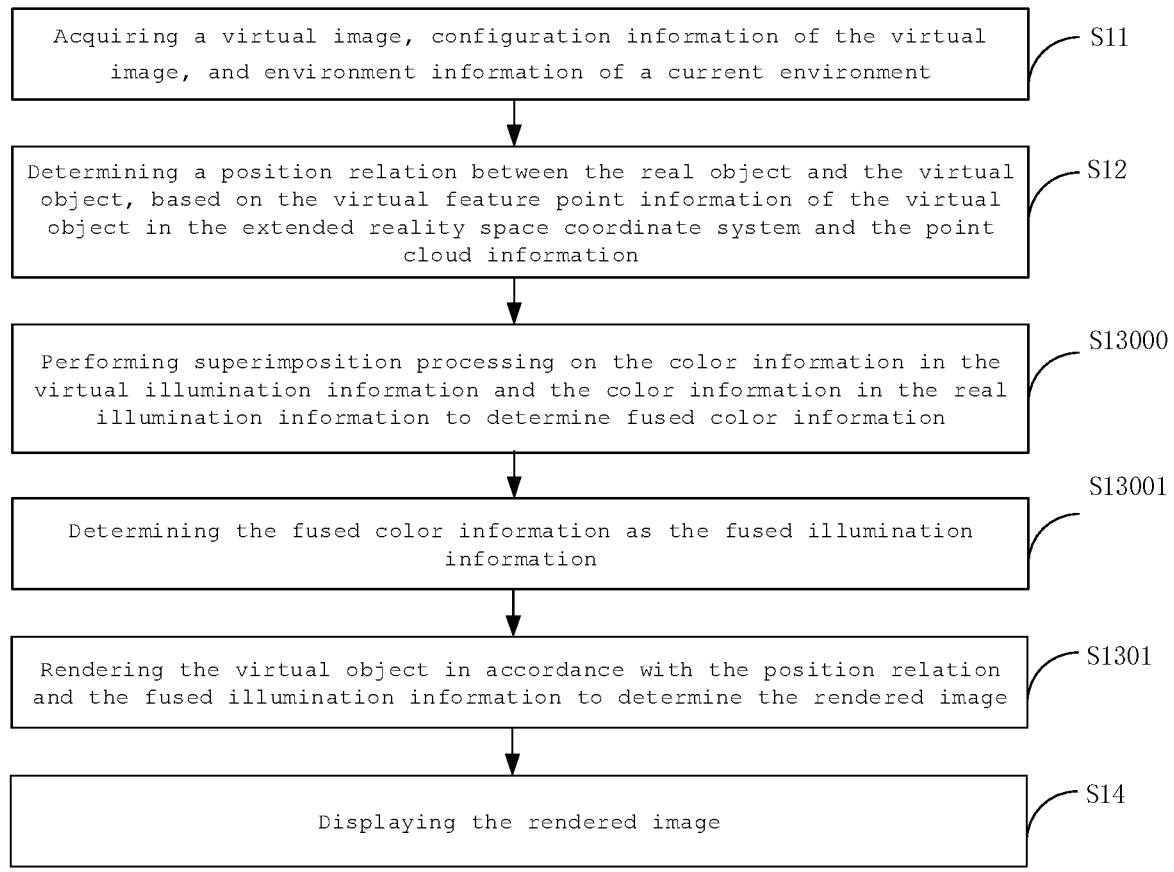
FIG. 6 is a sixth schematic flowchart of a display method according to an embodiment of the present disclosure.

As an alternative implementation of the present disclosure, the virtual illumination information and the real illumination information each includes color information, and the color information includes one or more of brightness, color temperature, white balance, soft light, and hard light; with reference to FIG. 5 and as shown in FIG. 6, the S1300 above may be specifically implemented by S13000 and S13001 described below.

S13000, performing superimposition processing on the color information in the virtual illumination information and the color information in the real illumination information, to determine fused color information.

In some examples, the color temperature in the fused color information is equal to a sum of a value of the color temperature of the color information in the virtual illumination information and a value of the color temperature of the color information in the real illumination information. The brightness in the fused color information is equal to a sum of the value of the brightness of the color information in the virtual illumination information and a value of the brightness of the color information in the real illumination information. The white balance in the fused color information is equal to a sum of a value of the white balance of the color information in the virtual illumination information and a value of the white balance of the color information in the real illumination information. The soft light in the fused color information is equal to a sum of a value of the soft light of the color information in the virtual illumination information and a value of the soft light of the color information in the real illumination information. The hard light in the fused color information is equal to a sum of a value of the hard light of the color information in the virtual illumination information and a value of the hard light of the color information in the real illumination information.

S13001, determining the fused color information as the fused illumination information.

Figure 7:
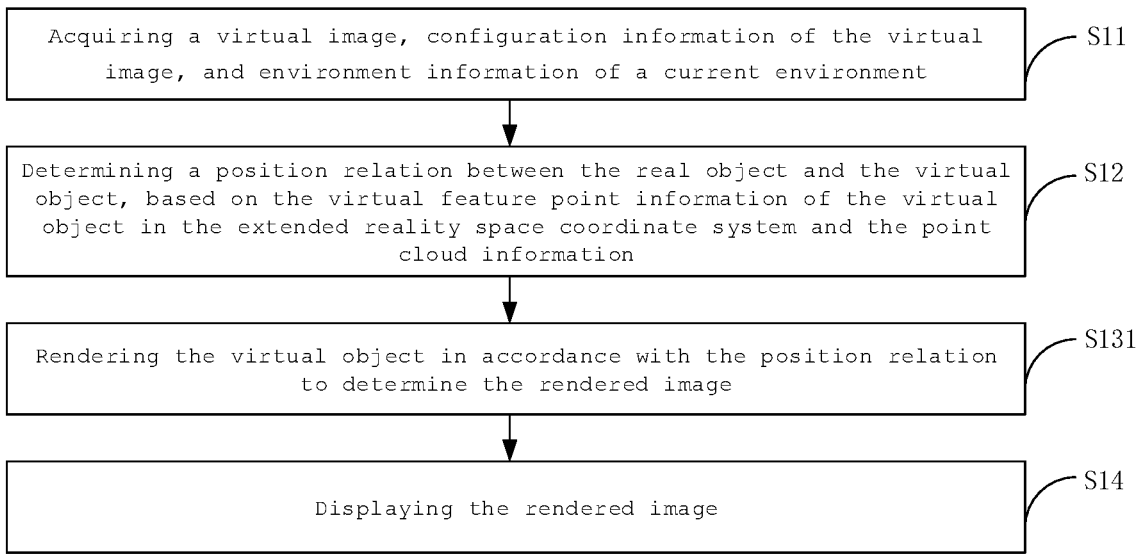
FIG. 7 is a seventh schematic flowchart of a display method according to an embodiment of the present disclosure.

As an alternative implementation of the present disclosure, with reference to FIG. 1 and as shown in FIG. 7, the S13 above may be specifically implemented by S131 described below.

S131, rendering the virtual object in accordance with the position relation to determine the rendered image.

The solutions provided by the embodiments of the present disclosure are described above mainly from the perspective of methods. In order to implement the above functions, corresponding hardware structure and/or software modules for performing the functions are included. Those of skill in the art will readily appreciate that the present disclosure is capable of being implemented in hardware or a combination of hardware and computer software in connection with the exemplary units and algorithm steps described in the embodiments of the present disclosure. Whether a function is performed in hardware or computer software driving hardware depends upon particular applications and design constraints of the technical solutions. Skilled artisans may implement the described functions in varying ways for each particular application, but such implementation should not be construed as departing from the scope of the present disclosure.

The embodiments of the present disclosure may divide function modules of the display apparatus in accordance with the above method examples, for example, each function module may be divided corresponding to each function, or two or more functions may be integrated into one processing module. The integrated module can be implemented in hardware and/or a software function module. It should be noted that, the division of the modules in the embodiment of the present disclosure is schematic, and is only one logic function division, and other divisions may be available in actual implementations.

Figure 8:
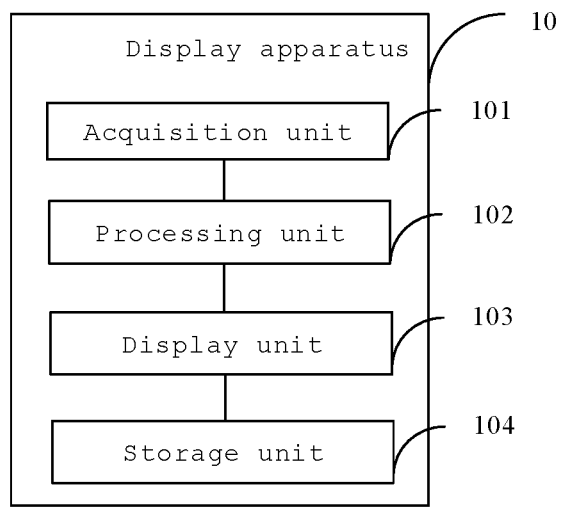
FIG. 8 is a schematic structural diagram of a display apparatus according to an embodiment of the present disclosure.

As shown in FIG. 8, an embodiment of the present disclosure provides a structural schematic diagram of a display apparatus 10. The display apparatus 10 comprises: an acquisition unit 101, a processing unit 102, and a display unit 103.

The acquisition unit 101 is configured to acquire a virtual image, configuration information of the virtual image, and environment information of a current environment; wherein the virtual image comprises at least one virtual object and virtual feature point information of the at least one virtual object in an extended reality space coordinate system, and the environment information comprises point cloud information of at least one real object; the processing unit 102 is configured to determine a position relation between the real object and the virtual object, based on virtual feature point information of the virtual object in the extended reality space coordinate system acquired by the acquisition unit 101 and the point cloud information acquired by the acquisition unit 101; the processing unit 102 is further configured to render the virtual object in accordance with one or more of the position relation, and the configuration information, and the environment information acquired by the acquisition unit 101, to determine a rendered image; and a display unit 103 is configured to display the rendered image.

As an alternative implementation of the present disclosure, the processing unit 102 is specifically configured to: pre-process the point cloud information acquired by the acquisition unit 101, and determine real feature point information of the real object in the extended reality space coordinate system; and the processing unit 102 is specifically configured to determine the position relation between the real object and the virtual object based on the real feature point information and the virtual feature point information of the virtual object in the extended reality space coordinate system acquired by the acquisition unit 101.

As an alternative implementation of the present disclosure, the virtual feature point information comprises at least one virtual feature point and virtual position information of each virtual feature point, and the real feature point information comprises at least one real feature point and real position information of each real feature point; the processing unit 102 is specifically configured to: determine a first depth distance of each virtual feature point from a target position point based on virtual position information of the virtual object in the extended reality space coordinate system acquired by the acquisition unit 101; the processing unit 102 is specifically configured to: determine a second depth distance of each real feature point from the target position point based on real position information of the real object in the extended reality space coordinate system; and the processing unit 102 is specifically configured to: determine the position relation between the real object and the virtual object in accordance with the first depth distance and the second depth distance.

As an alternative implementation of the present disclosure, the configuration information comprises virtual illumination information, and the environment information further comprises real illumination information; the processing unit 102 is specifically configured to: render the virtual object in accordance with the position relation, the virtual illumination information, and the real illumination information, to determine the rendered image.

As an alternative implementation of the present disclosure, the processing unit 102 is specifically configured to: perform fusion processing on the virtual illumination information and the real illumination information to determine fused illumination information; and the processing unit 102 is specifically configured to: render the virtual object in accordance with the position relation and the fused illumination information, to determine the rendered image.

As an alternative implementation of the present disclosure, the virtual illumination information and the real illumination information each comprises color information, and the color information comprises one or more of brightness, color temperature, white balance, soft light, and hard light; the processing unit 102 is specifically configured to: perform superimposition processing on the color information in the virtual illumination information and the color information in the real illumination information, to determine fused color information; and the processing unit 102 is specifically configured to: determine the fused color information as the fused illumination information.

As an alternative implementation of the present disclosure, the processing unit 102 is specifically configured to: render the virtual object in accordance with the position relation, to determine the rendered image.

All relevant contents of the steps involved in the above method embodiments may be quoted to the functional description of the corresponding function modules, and the functions thereof are not described herein again.

Of course, the display apparatus 10 in accordance with the embodiment of the present disclosure comprises, but is not limited to, the above modules, for example, the display apparatus 10 may further comprise a storage unit 104. The storage unit 104 may be configured to store program code of the display apparatus 10, and store data generated by the display apparatus 10 during operation, such as data in a write request.

Figure 9:
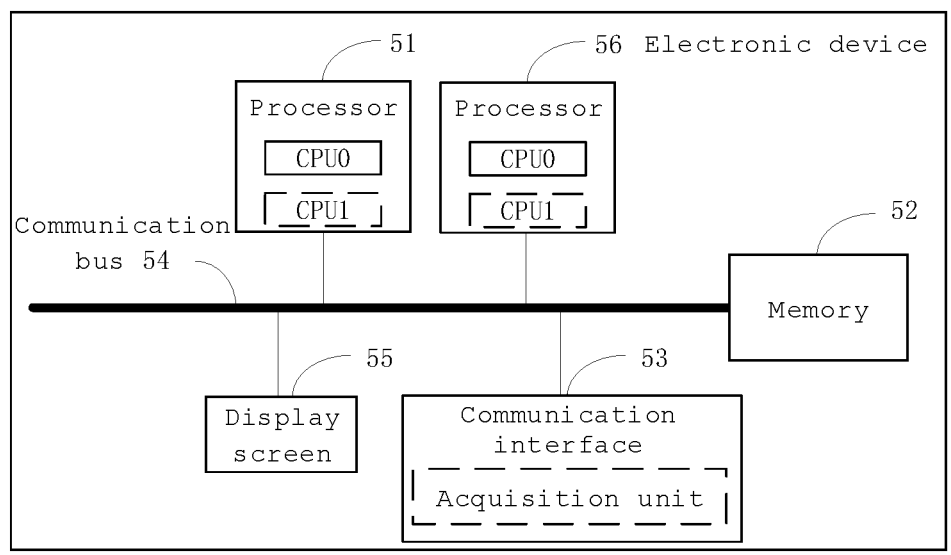
FIG. 9 is a schematic structural diagram of an electronic device according to an embodiment of the present disclosure.

FIG. 9 is a schematic structural diagram of an electronic device in accordance with an embodiment of the present disclosure, and as shown in FIG. 9, the electronic device may include: at least one processor 51, a memory 52, a communication interface 53, a communication bus 54 and a display screen 55.

Each component of the electronic device is specifically described below with reference to FIG. 9.

Processor 51 is a control center of the electronic device, and may be a single processor or a general term for multiple processing elements. For example, the processor 51 is a Central Processing Unit (CPU), an Application Specific Integrated Circuit (ASIC), or one or more integrated circuits configured to implement the embodiments of the present disclosure, such as: one or more DSPs, or one or more Field Programmable Gate Arrays (FPGAs).

In particular implementations, as an embodiment, the processor 51 may include one or more CPUs, such as CPU0 and CPU1 shown in FIG. 9. Also, as an embodiment, the electronic device may include multiple processors, such as processor 51 and processor 56 shown in FIG. 9. Each of these processors may be a single-core processor (Single-CPU) or a multi-core processor (Multi-CPU). The processor herein may refer to one or more devices, circuits, and/or processing cores for processing data (e.g., computer program instructions).

Memory 52 may be a Read-Only Memory (ROM) or other types of static storage devices that can store static information and instructions, a Random Access Memory (RAM) or other types of dynamic storage devices that can store information and instructions, an Electrically Erasable Programmable Read-Only Memory (EEPROM), a Compact Disc Read-Only Memory (CD-ROM) or other optical disk storage, optical disc storage (including compact disc, laser disc, optical disc, digital versatile disc, blu-ray disc, etc.), magnetic disk storage medium or other magnetic storage devices, or any other medium that can be used to carry or store desired program code in the form of instructions or data structures and that can be accessed by a computer, but is not limited to these. The memory 52 may be an separate component and coupled to the processor 51 via a communication bus 54. The memory 52 may also be integrated with the processor 51.

In particular implementations, the memory 52 is used to store data in the present disclosure and execute software programs of the present disclosure. The processor 51 may perform various functions of the electronic device by running or executing the software programs stored in the memory 52 and calling the data stored in the memory 52.

Communication interface 53 is used for, using any device such as a transceiver, communicating with other devices or communication networks, such as a Radio Access Network (RAN), a Wireless Local Area Network (WLAN), a terminal, and cloud. The communication interface 53 may include an acquisition unit to achieve the acquisition function.

The communication bus 54 may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, etc. For ease of illustration, only one thick line is shown in FIG. 9, but that does not indicate only one bus or one type of bus.

Display screen 55 is used to display images, video, and the like. The display screen 55 includes a display panel. The display panel may adopt a Liquid Crystal Display (LCD), an organic light-emitting diode (OLED), an active-matrix organic light emitting diode (AMOLED), a flex light-emitting diode (FLED), a Miniled, a MicroLed, a Micro-oLed, a quantum dot light emitting diode (QLED), or the like.

As an example, in conjunction with FIG. 8, the acquisition unit 101 in the display apparatus 10 achieves the same function as the communication interface 53 in FIG. 9, the processing unit 102 in the display apparatus 10 achieves the same function as the processor 51 in FIG. 9, the display unit 103 in the display apparatus 10 achieves the same function as the display screen 55 in FIG. 9, and the storage unit 104 in the display apparatus 10 achieves the same function as the memory 52 in FIG. 9.

Another embodiment of the present disclosure also provides a non-transitory computer-readable storage medium having a computer program stored thereon, which, when executed by a processor, causes the processor to implement the display method in accordance with any one of the examples above.

In some embodiments, the disclosed methods may be implemented as computer program instructions encoded on a computer-readable storage medium or encoded on other non-transitory medium or articles in a machine-readable format.

Figure 10:
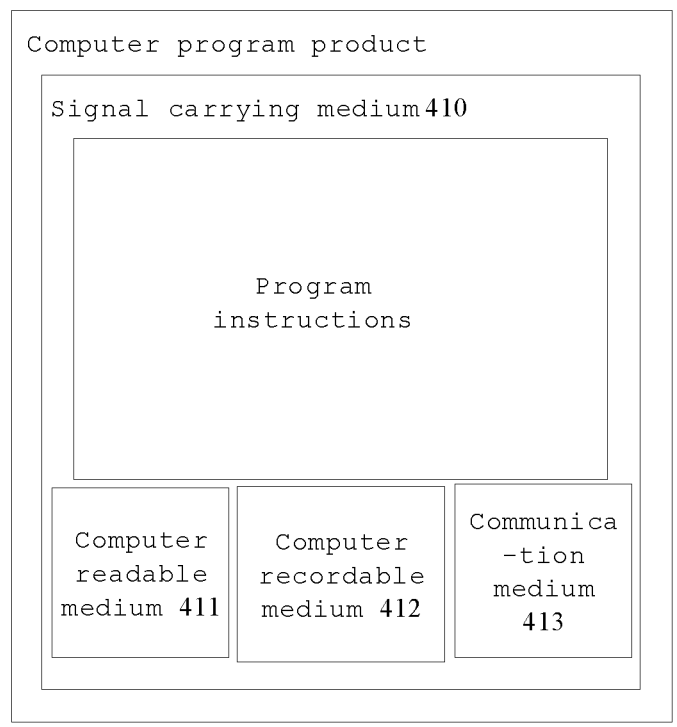
FIG. 10 is a schematic structural diagram of a computer program product of a display method according to an embodiment of the present disclosure.

FIG. 10 schematically illustrates a conceptual partial view of a computer program product comprising a computer program for executing a computer process on a processor, which is provided in accordance with the embodiments of the present disclosure.

In one embodiment, the computer program product is provided using a signal carrying medium 410. The signal carrying medium 410 may include one or more program instructions that, when executed by one or more processors, may provide the functions or part of the functions described above with respect to FIG. 1. Thus, for example, referring to the embodiment illustrated in FIG. 1, one or more features of S11-S14 may be undertaken by one or more instructions associated with the signal carrying medium 410. Further, the program instructions in FIG. 10 also describe example instructions.

In some examples, the signal carrying medium 410 may comprise a computer readable medium 411, such as, but not limited to, a hard disk drive, a Compact Disc (CD), a Digital Video Disc (DVD), a digital tape, a memory, a read-only memory (ROM), a random access memory (RAM), or the like.

In some implementations, the signal carrying medium 410 may comprise a computer recordable medium 412, such as, but not limited to, a memory, a read/write (R/W) CD, a R/W DVD, or the like.

In some implementations, the signal carrying medium 410 may include a communication medium 413, such as, but not limited to, a digital and/or analog communication medium (e.g., a fiber optic cable, a waveguide, a wired communication link, a wireless communication link, etc.).

The signal carrying medium 410 may be achieved by a wireless form of communication medium 413 (e.g., a wireless communication medium conforming to the IEEE 802.41 standard or other transmission protocols). The one or more program instructions may be, for example, computer-executable instructions or logic-implemented instructions.

In some examples, the display apparatus such as that described with respect to FIG. 8 may be configured to provide various operations, functions, or actions, in response to one or more program instructions in the computer readable medium 411, computer recordable medium 412, and/or communication medium 413.

Through the description of the foregoing implementations, it will be clear to those skilled in the art that, for convenience and simplicity of description, only the division of the function modules is illustrated, and in practical applications, the above functions may be distributed to be completed by different function modules as needed, that is, the internal structure of the apparatus may be divided into different function modules to complete all or part of the above described functions.

In the several embodiments provided in the present disclosure, it should be understood that the disclosed apparatus and method may be implemented in other manners. For example, the above-described apparatus embodiments are merely illustrative, and for example, the division of the modules or units is only one type of logical functional division, and there may be other divisions in actual implementations, for example, multiple units or components may be combined or integrated into another apparatus, or some features may be omitted, or not executed. In addition, the shown or discussed mutual coupling or direct coupling or communication connection may be an indirect coupling or communication connection through some interfaces, devices or units, and may be in an electrical, mechanical or other forms.

The units described as separate components may or may not be physically separate, and components displayed as units may be one physical unit or multiple physical units, that is, they may be located in one place, or may be distributed in multiple different places. Some or all of the units can be selected in accordance with actual needs to achieve the purpose of the solution of the embodiment.

In addition, functional units in the embodiments of the present disclosure may be integrated into one processing unit, or each unit may exist alone physically, or two or more units may be integrated into one unit. The integrated unit may be implemented in the form of hardware and/or in the form of a software functional unit.

The integrated unit, if implemented in the form of a software functional unit and sold or used as a stand-alone product, may be stored in a readable storage medium. Based on such understanding, the technical solution of the embodiment of the present disclosure essentially, or a part of the technical solution contributing to the related art, or all or part of the technical solution may be embodied in the form of a software product, where the software product is stored in a storage medium and includes several instructions to enable a device (which may be a single chip microcomputer, a chip, etc.) or a processor to execute all or part of the steps of the method in accordance with the embodiments of the present disclosure. The aforementioned storage medium includes various medium capable of storing program code such as a U disk, a portable hard disk, a ROM, a RAM, a magnetic disk or an optical disk, or the like.

The foregoing only describes particular embodiments of the present disclosure, so as to enable those skilled in the art to understand or implement the present disclosure. Various modifications to these embodiments will be apparent to those skilled in the art, and the general principles defined herein may be implemented in other embodiments without departing from the spirit or scope of the present disclosure. Thus, the present disclosure is not intended to be limited to the embodiments described herein but is to be accorded with the widest scope consistent with the principles and novel characteristics disclosed herein.

What is claimed is:

1. A display method, comprising:
   acquiring a virtual image, configuration information of the virtual image, and environment information of a current environment; wherein the virtual image comprises at least one virtual object and virtual feature point information of the at least one virtual object in an extended reality space coordinate system, and the environment information comprises point cloud information of at least one real object;
   determining a position relation between the real object and the virtual object, based on the virtual feature point information of the virtual object in the extended reality space coordinate system and the point cloud information;
   rendering the virtual object in accordance with one or more of the position relation, the configuration information, and the environment information, to determine a rendered image; and
   displaying the rendered image.

2. The display method according to claim 1, wherein the determining a position relation between the real object and the virtual object, based on the virtual feature point information of the virtual object in the extended reality space coordinate system and the point cloud information, comprises:
pre-processing the point cloud information, and determining real feature point information of the real object in the extended reality space coordinate system; and
determining the position relation between the real object and the virtual object, based on the real feature point information and the virtual feature point information of the virtual object in the extended reality space coordinate system.

3. The display method according to claim 2, wherein the virtual feature point information comprises at least one virtual feature point and virtual position information of each virtual feature point, and the real feature point information comprises at least one real feature point and real position information of each real feature point; and
the determining the position relation between the real object and the virtual object based on the real feature point information and the virtual feature point information of the virtual object in the extended reality space coordinate system comprises:
determining a first depth distance of each virtual feature point from a target position point, based on the virtual position information of the virtual object in the extended reality space coordinate system;
determining a second depth distance of each real feature point from the target position point, based on the real position information of the real object in the extended reality space coordinate system; and
determining the position relation between the real object and the virtual object in accordance with the first depth distance and the second depth distance.

4. The display method according to claim 1, wherein the configuration information comprises virtual illumination information, and the environment information further comprises real illumination information; and
the rendering the virtual object in accordance with one or more of the position relation, the configuration information, and the environment information, to determine a rendered image, comprises:
rendering the virtual object in accordance with the position relation, the virtual illumination information, and the real illumination information, to determine the rendered image.

5. The display method according to claim 4, wherein the rendering the virtual object in accordance with the position relation, the virtual illumination information, and the real illumination information, to determine the rendered image, comprises:
performing fusion processing on the virtual illumination information and the real illumination information to determine fused illumination information; and
rendering the virtual object in accordance with the position relation and the fused illumination information to determine the rendered image.

6. The display method according to claim 5, wherein the virtual illumination information and the real illumination information each comprises color information, and the color information comprises one or more of brightness, color temperature, white balance, soft light, and hard light; and
the performing fusion processing on the virtual illumination information and the real illumination information to determine fused illumination information, comprises:
performing superimposition processing on the color information in the virtual illumination information and the color information in the real illumination information to determine fused color information; and
determining the fused color information as the fused illumination information.

7. The display method according to claim 1, wherein the rendering the virtual object in accordance with one or more of the position relation, the configuration information, and the environment information, to determine a rendered image, comprises:
rendering the virtual object in accordance with the position relation to determine the rendered image.

8. An electronic device, comprising: a memory configured to store a computer program, and a processor configured to, when executing the computer program, causes the electronic device to perform the following operations:
acquiring a virtual image, configuration information of the virtual image, and environment information of a current environment; wherein the virtual image comprises at least one virtual object and virtual feature point information of the at least one virtual object in an extended reality space coordinate system, and the environment information comprises point cloud information of at least one real object;
determining a position relation between the real object and the virtual object, based on the virtual feature point information of the virtual object in the extended reality space coordinate system and the point cloud information;
rendering the virtual object in accordance with one or more of the position relation, the configuration information, and the environment information, to determine a rendered image; and
displaying the rendered image.

9. The electronic device according to claim 8, wherein the determining a position relation between the real object and the virtual object, based on the virtual feature point information of the virtual object in the extended reality space coordinate system and the point cloud information, comprises:
pre-processing the point cloud information, and determining real feature point information of the real object in the extended reality space coordinate system; and
determining the position relation between the real object and the virtual object, based on the real feature point information and the virtual feature point information of the virtual object in the extended reality space coordinate system.

10. The electronic device according to claim 9, wherein the virtual feature point information comprises at least one virtual feature point and virtual position information of each virtual feature point, and the real feature point information comprises at least one real feature point and real position information of each real feature point; and
the determining the position relation between the real object and the virtual object based on the real feature point information and the virtual feature point information of the virtual object in the extended reality space coordinate system comprises:
determining a first depth distance of each virtual feature point from a target position point, based on the virtual position information of the virtual object in the extended reality space coordinate system;
determining a second depth distance of each real feature point from the target position point, based on the real position information of the real object in the extended reality space coordinate system; and determining the position relation between the real object and the virtual object in accordance with the first depth distance and the second depth distance.

11. The electronic device according to claim 8, wherein the configuration information comprises virtual illumination information, and the environment information further comprises real illumination information; and
   the rendering the virtual object in accordance with one or more of the position relation, the configuration information, and the environment information, to determine a rendered image, comprises:
   rendering the virtual object in accordance with the position relation, the virtual illumination information, and the real illumination information, to determine the rendered image.

12. The electronic device according to claim 11, wherein the rendering the virtual object in accordance with the position relation, the virtual illumination information and the real illumination information, to determine the rendered image, comprises:
   performing fusion processing on the virtual illumination information and the real illumination information to determine fused illumination information; and
   rendering the virtual object in accordance with the position relation and the fused illumination information to determine the rendered image.

13. The electronic device according to claim 12, wherein the virtual illumination information and the real illumination information each comprises color information, and the color information comprises one or more of brightness, color temperature, white balance, soft light, and hard light; and
   the performing fusion processing on the virtual illumination information and the real illumination information to determine fused illumination information, comprises:
   performing superimposition processing on the color information in the virtual illumination information and the color information in the real illumination information to determine fused color information; and
   determining the fused color information as the fused illumination information.

14. The electronic device according to claim 8, wherein the rendering the virtual object in accordance with one or more of the position relation, the configuration information, and the environment information, to determine a rendered image, comprises:
   rendering the virtual object in accordance with the position relation to determine the rendered image.

15. A non-transitory computer-readable storage medium, having a computer program stored thereon, which, when executed by a processor, causes the processor to perform the following operations:
   acquiring a virtual image, configuration information of the virtual image, and environment information of a current environment; wherein the virtual image comprises at least one virtual object and virtual feature point information of the at least one virtual object in an extended reality space coordinate system, and the environment information comprises point cloud information of at least one real object;
   determining a position relation between the real object and the virtual object, based on the virtual feature point information of the virtual object in the extended reality space coordinate system and the point cloud information;
   rendering the virtual object in accordance with one or more of the position relation, the configuration information, and the environment information, to determine a rendered image; and
   displaying the rendered image.

16. The computer-readable storage medium according to claim 15, wherein the determining a position relation between the real object and the virtual object, based on the virtual feature point information of the virtual object in the extended reality space coordinate system and the point cloud information, comprises:
   pre-processing the point cloud information, and determining real feature point information of the real object in the extended reality space coordinate system; and
   determining the position relation between the real object and the virtual object, based on the real feature point information and the virtual feature point information of the virtual object in the extended reality space coordinate system.

17. The computer-readable storage medium according to claim 16, wherein the virtual feature point information comprises at least one virtual feature point and virtual position information of each virtual feature point, and the real feature point information comprises at least one real feature point and real position information of each real feature point; and
   the determining the position relation between the real object and the virtual object based on the real feature point information and the virtual feature point information of the virtual object in the extended reality space coordinate system comprises:
   determining a first depth distance of each virtual feature point from a target position point, based on the virtual position information of the virtual object in the extended reality space coordinate system;
   determining a second depth distance of each real feature point from the target position point, based on the real position information of the real object in the extended reality space coordinate system; and
   determining the position relation between the real object and the virtual object in accordance with the first depth distance and the second depth distance.

18. The computer-readable storage medium according to claim 15, wherein the configuration information comprises virtual illumination information, and the environment information further comprises real illumination information; and
   the rendering the virtual object in accordance with one or more of the position relation, the configuration information, and the environment information, to determine a rendered image, comprises:
   rendering the virtual object in accordance with the position relation, the virtual illumination information, and the real illumination information, to determine the rendered image.

19. The computer-readable storage medium according to claim 18, wherein the rendering the virtual object in accordance with the position relation, the virtual illumination information and the real illumination information, to determine the rendered image, comprises:
   performing fusion processing on the virtual illumination information and the real illumination information to determine fused illumination information; and
   rendering the virtual object in accordance with the position relation and the fused illumination information to determine the rendered image.

20. The computer-readable storage medium according to claim 19, wherein the virtual illumination information and the real illumination information each comprises color information, and the color information comprises one or more of brightness, color temperature, white balance, soft light, and hard light; and the performing fusion processing on the virtual illumination information and the real illumination information to determine fused illumination information, comprises:

performing superimposition processing on the color information in the virtual illumination information and the color information in the real illumination information to determine fused color information; and determining the fused color information as the fused illumination information.

\* \* \* \* \*